Sept. 5, 1944.   H. W. RUPPEL   2,357,428
AUTOMATIC SCREW MACHINE
Filed May 11, 1940   7 Sheets-Sheet 1

INVENTOR.
Harry W. Ruppel
BY
Parker, Carlson, Pitzner & Hubbard
ATTORNEYS

Sept. 5, 1944.　　　H. W. RUPPEL　　　2,357,428
AUTOMATIC SCREW MACHINE
Filed May 11, 1940　　　7 Sheets-Sheet 4

INVENTOR.
Harry W. Ruppel
BY
Parker, Carlson, Pitzner & Hubbard
ATTORNEY.

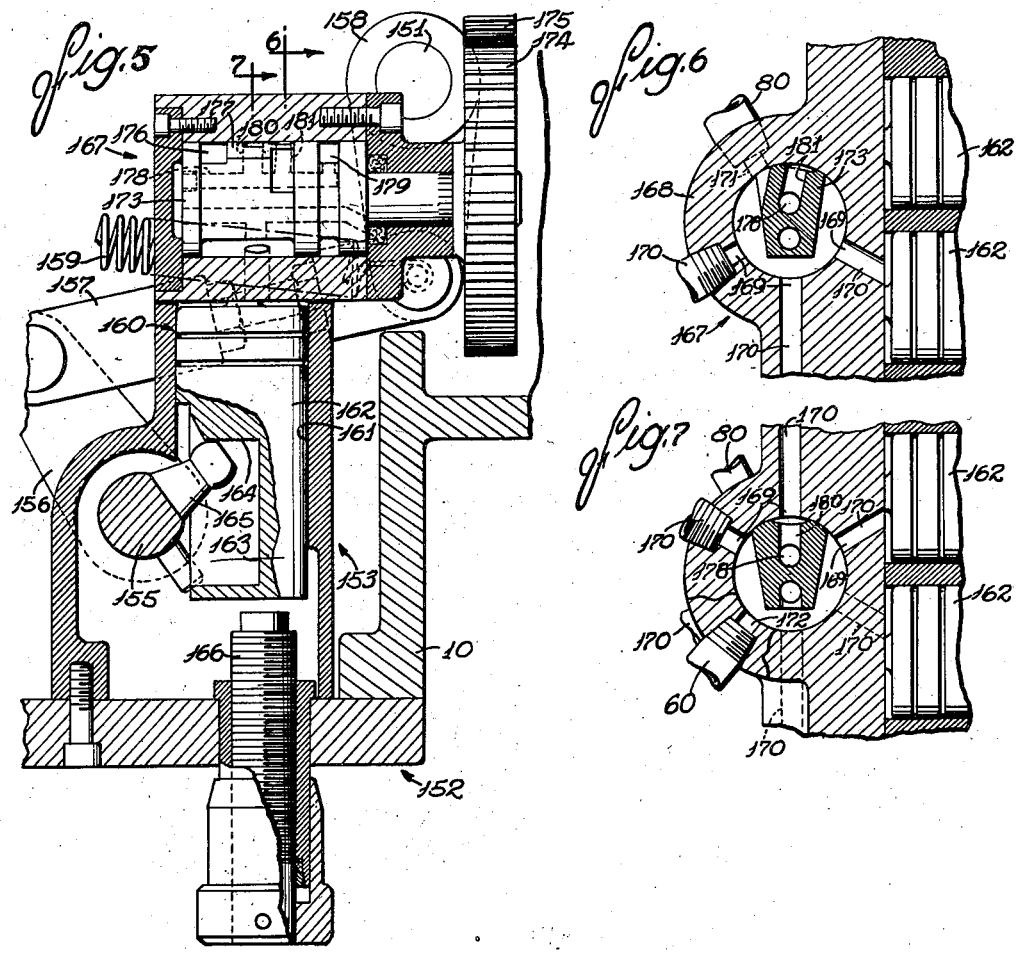
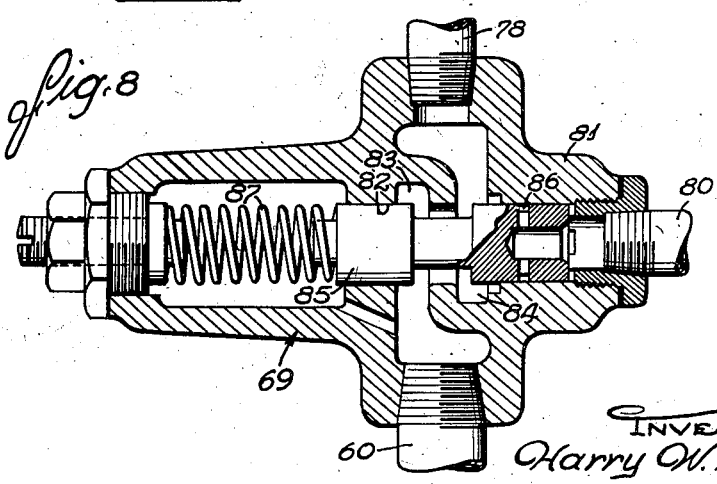

Sept. 5, 1944. H. W. RUPPEL 2,357,428
AUTOMATIC SCREW MACHINE
Filed May 11, 1940 7 Sheets-Sheet 6
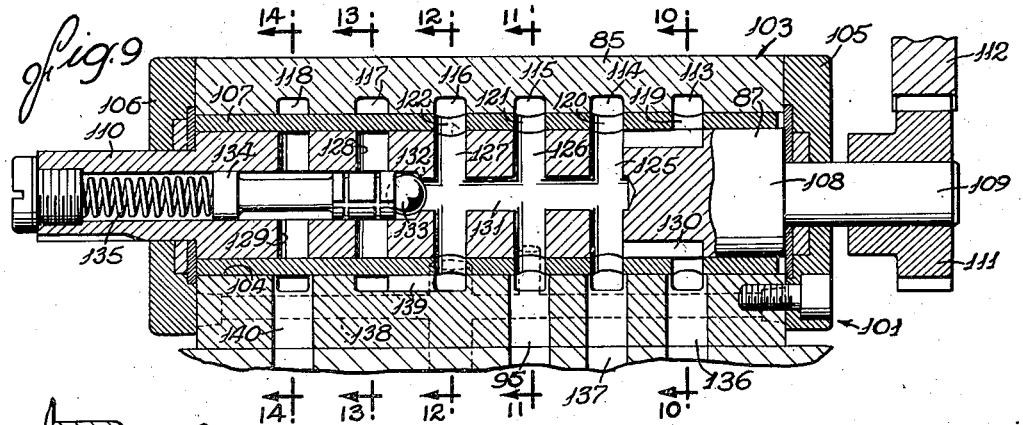
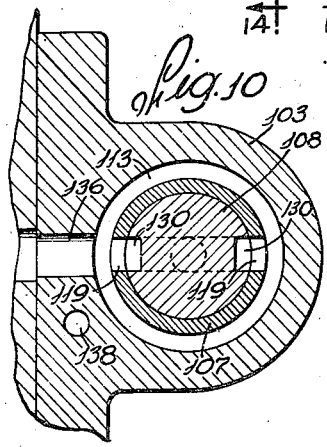
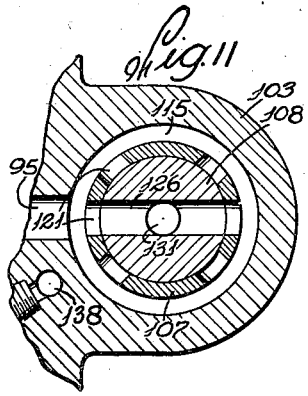
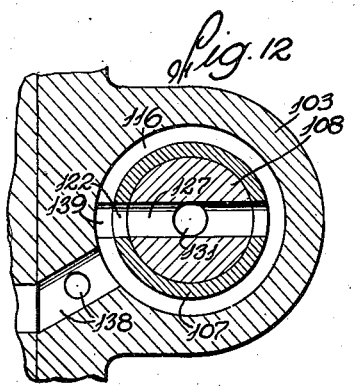
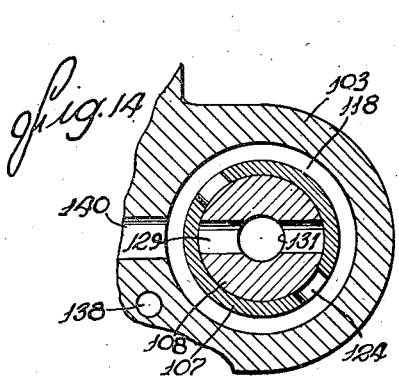
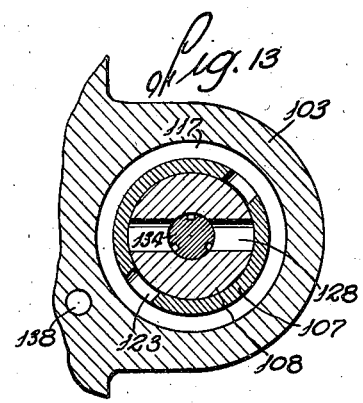
INVENTOR
Harry W. Ruppel
By Parker, Carlson, Pitzner & Hatton
ATTORNEYS

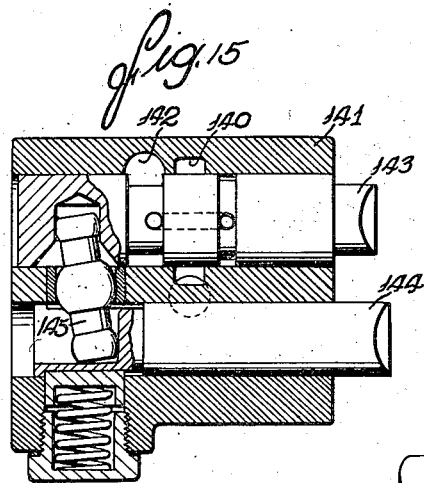
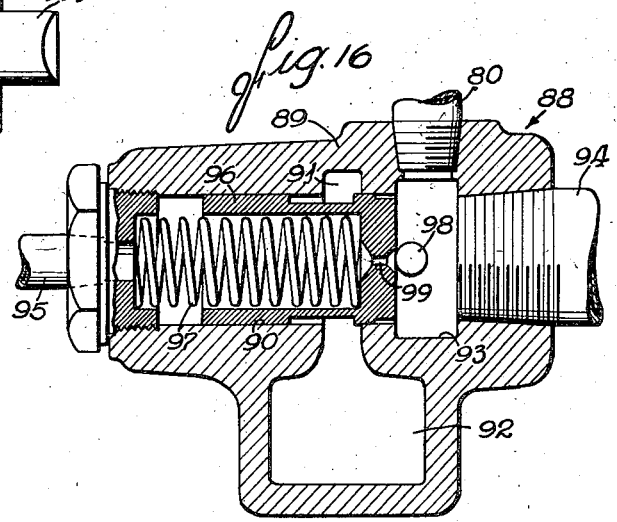
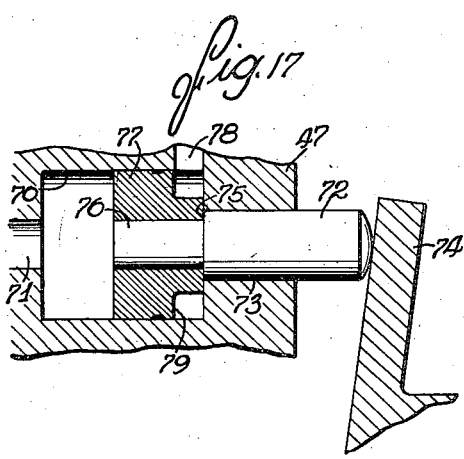

Patented Sept. 5, 1944

2,357,428

UNITED STATES PATENT OFFICE 2,357,428

AUTOMATIC SCREW MACHINE

Harry W. Ruppel, Cleveland, Ohio, assignor to The Foote-Burt Company, Cleveland, Ohio, a corporation of Ohio Application May 11, 1940, Serial No. 334,627

17 Claims. (Cl. 29—43)

The present invention relates to automatic screw machines, and has particular reference to a hydraulic transmission for driving or controlling the various operating elements of such machines.

One of the objects of the present invention is to provide a novel hydraulic transmission which is operable either automatically or manually to obtain a program of speeds including rapid traverse and a wide range of selective feeds.

A more specific object is to provide a new and improved hydraulic transmission for an automatic screw machine having a multiple tool turret axially reciprocable in a cutting stroke and periodically rotatable to index successive tools into operative position, said transmission being adjustable to provide independent feed rates for the different tools in their respective operating cycles.

Other objects and advantages will become apparent as the description proceeds.

In the accompanying drawings, Figure 1 is a front perspective view of a machine having a hydraulic transmission embodying the features of my invention.

Fig. 5 is a sectional view taken substantially along line 5—5 of Fig. 4.

Figure 1:
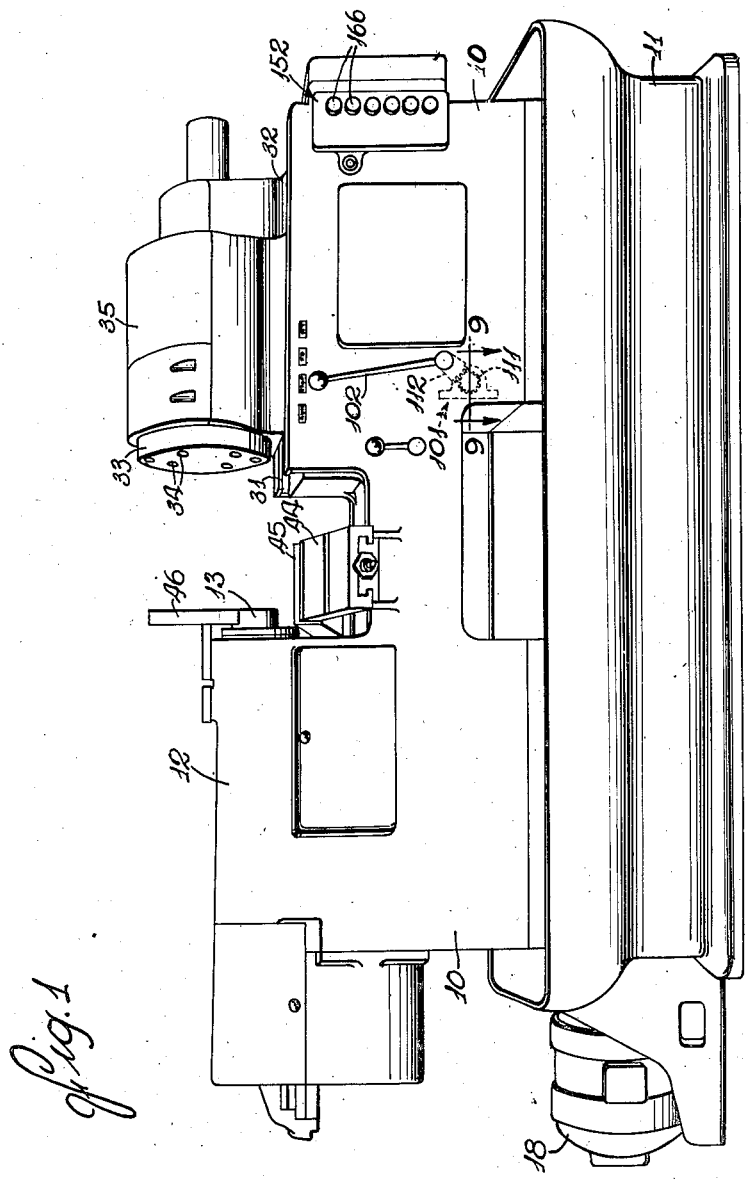
Figure 2:
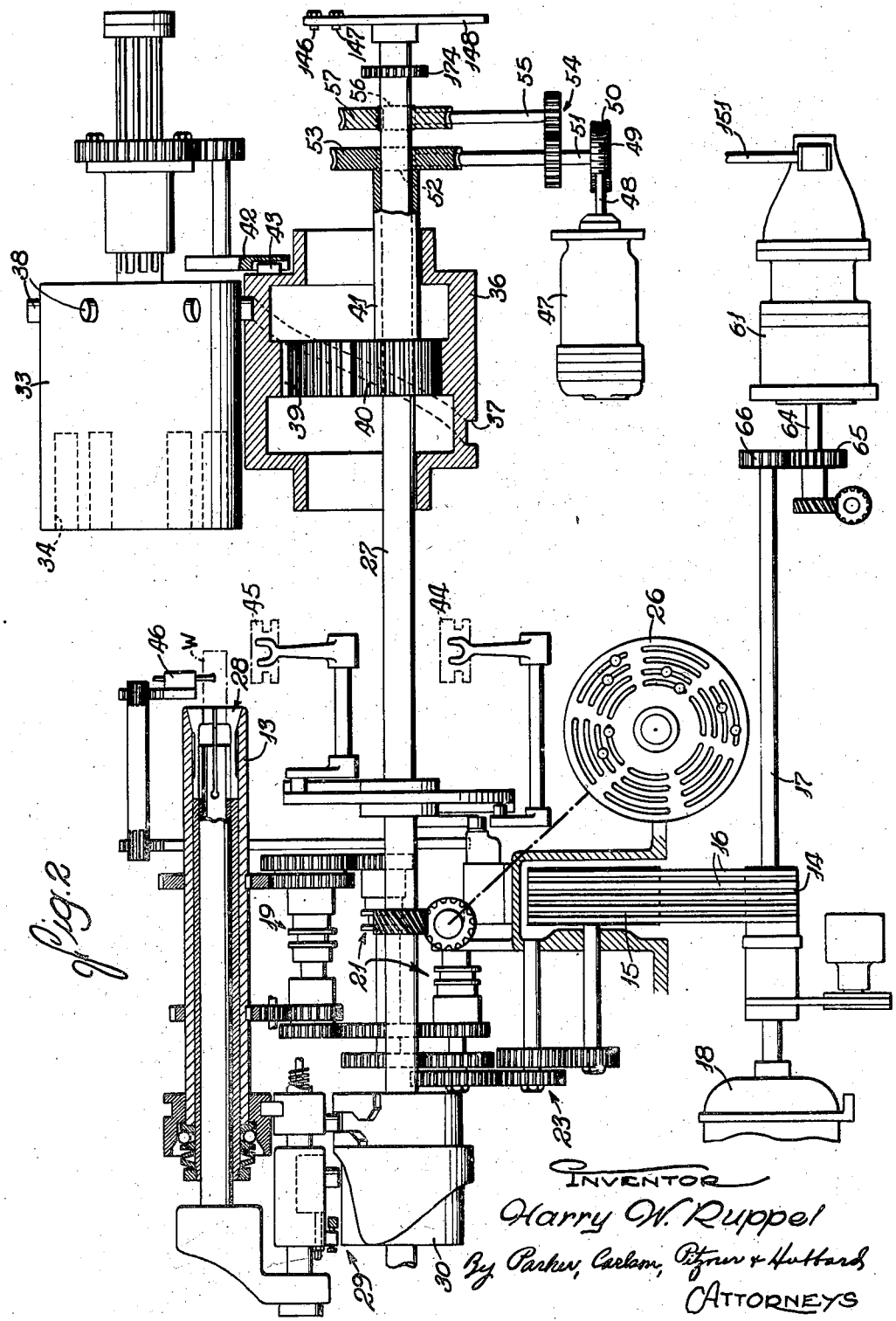
Fig. 2 is a diagrammatic representation of the movable elements of the machine.

Figs. 6 and 7 are transverse sectional views taken respectively along lines 6—6 and 7—7 of Fig. 5.

Fig. 8 is a sectional view of a valve forming part of the transmission system.

Fig. 9 is a longitudinal sectional view of another valve.

Figs. 10 to 14, inclusive, are transverse sectional views taken respectively along lines 10—10 to 14—14 of Fig. 9.

Figs. 15 and 16 are detail sectional views respectively of two other valves.

Fig. 17 is a fragmentary detail view of a hydraulic motor forming part of the transmission.

Referring more particularly to the drawings, the automatic screw machine constituting the exemplary embodiment of the invention comprises a hollow elongated horizontal frame 10 rigidly mounted on a floor base 11. One end of the frame 10 is formed integral with an elevated housing 12 enclosing a rotatably supported hollow work spindle 13. A gear transmission is provided for driving the spindle 13, this transmission being connected through pulleys 14 and 15 and connecting belts 16 to a main drive shaft 17 driven by a motor 18. The transmission includes a reversing mechanism 19 operable by a hydraulic actuator 20, a high and low speed mechanism 21 operable by a hydraulic actuator 22 and speed change gearing 23 as more fully disclosed in my copending application Serial No. 334,623, filed May 11, 1940. The hydraulic actuators 20 and 22 are respectively under the control of two valves 24 and 25 operable automatically in predetermined timed relation by a cam disk 26 driven by a cam shaft 27 extending longitudinally through the frame 10.

A bar of stock W is adapted to be fed intermittently through the spindle 13 and between the jaws of an automatic chuck 28 by a stock feed mechanism 29. The chuck 28 and the stock feed mechanism 29 are automatically operable in timed sequence by a cam drum 30 on the shaft 27. The construction of the chuck 28 and the stock feed mechanism is more fully disclosed in my copending application Serial No. 334,626, filed May 11, 1940, now Patent No. 2,310,259, dated February 9, 1943.

The other end of the frame 10 is formed with elevated horizontal guides 31 supporting a slide 32 for adjustment longitudinally of the spindle 13. A tool turret 33 having a plurality of annularly arranged parallel tool receiving holes 34, is mounted in a turret housing 35 integral with the slide 32 for axial reciprocation and for rotation to bring successive tools (not shown) into operation upon the bar stock projecting axially from the chuck 28. The reciprocatory drive for the turret 33 comprises a cam drum 36 having a continuous groove 37 and mounted for rotation on the underside of the slide 32. A plurality of cam rollers 38 corresponding in number and spacing to the holes 34 project radially from the turret 33 for selective engagement with the groove 37. The cam drum 36 is adapted to be rotated through the internal gear 39 meshing with the pinion 40 on a sleeve 41 receiving the cam shaft 27. An intermittent Geneva motion device 42 is operable by a roller 43 on one end of the cam drum 36 to index the turret 33 through a distance between consecutive tool holes 34 each time that the turret is retracted into inoperative position. The turret indexing mechanism is more fully disclosed in my copending application Serial No. 334,625, filed May 11, 1940.

Two cross slides 44 and 45 are mounted on the front and rear of the frame 10 between the spindle 13 and the turret 33, and are adapted to support additional tools (not shown) for operating on the stock bar. An automatically operable independent cut-off mechanism 46 is mounted on the spindle housing 12 for severing the finished work piece from the stock bar at the end of the machine operation. The cross slides 44 and 45 and the cut-off mechanism 46 are operable from the main cam shaft 27 of the machine.

The two drive shafts 27 and 41 are adapted to be driven in timed relation by a rotary hydraulic motor 47. This motor has a shaft 48 connected through a worm 49 and worm wheel 50 to a shaft 51 in turn connected through a worm 52 and worm wheel 53 to the sleeve 41. The shaft 51 is connected through reduction gears 54 to a shaft 55 in turn connected through a worm 56 and worm wheel 57 to the cam shaft 27. The speed ratios are such that the cam drum 36 will rotate the required number of times, for example, six times, to index the various holes 34 of the turret 33 successively into a working station relative to the work while the cam shaft 27 is making one complete revolution.

The rotary hydraulic motor 47 may be of any suitable construction adapted to operate at rapid traverse and variable feed rates. It is mounted on a base plate 58 within the machine frame 10, and connected to a high pressure inlet or supply passage 59 and an exhaust passage 60. Full details of the internal construction of the motor 47 are not shown since, per se, they constitute no part of the invention. A fragment of one of the piston and cylinder units of the motor 47 is, however, disclosed in Fig. 17, and will be hereinafter described to facilitate a clearer understanding of the control of the hydraulic transmission. It is sufficient to say at this time that the motor is of the piston type, having a plurality of large pistons adapted to be rendered inactive upon a predetermined rise in back pressure, and a plurality of small pistons active at all times, either without the large pistons to handle the entire volume of motive fluid supplied to effect rapid traverse operation, or conjointly with the large pistons to effect feed operation. The motor 47 is therefore adjustable to operate at either rapid traverse or feed on any given volume of motive fluid supplied through the conduit 59. The rate of feed operation is further subject to variation by altering the volume of motive fluid supplied. In the present instance, the motor 47 has a feed change of from 3 to 240 R. P. M., and a rapid traverse rate of approximately 2000 R. P. M.

A variable delivery pump 61 having a suction or intake passage 62 opening from a sump 63 within the frame 10, is connected to deliver a fluid medium, such as oil, under a relatively high pressure to the conduit 59 leading to the motor 47. The pump 61 is adapted to be driven at a constant speed from a suitable source of power, such as the electric motor 18. Thus, the pump 61 has a drive shaft 64 connected through gears 65 and 66 to the line shaft 17. An adjustable relief valve 67, discharging to the sump 63, is connected in a branch of the pressure passage 59, and limits the pressure of the motive fluid displaced by the pump 61 to a predetermined maximum. The exhaust passage 60 of the motor 47 discharges to the sump 63 and has a back pressure valve 68 interposed therein.

Regulation of the effective back pressure to adjust the volumetric capacity of the motor is under the control of a valve 69. Fig. 17 shows one cylinder 70 of the motor 47 open at the pressure end to a passage 71 which is adapted for connection alternately to the high pressure conduit 59 and the exhaust conduit 60 by valve means (not shown). An actuating plunger 72 is reciprocable in a bore 73 opening to the other end of the cylinder 70 and projects externally therefrom for operative engagement with an inclined swash plate 74. The inner end of the plunger 72 is reduced in diameter to define a shoulder 75, and constitutes a small piston 76 reciprocable axially within the cylinder 70. A large annular piston 77 is slidably reciprocable in the cylinder 70 and is slidably mounted on the small piston 76 for relative movement into and out of abutting engagement with the shoulder 75. Opening to the low pressure end of the cylinder 70 is a control passage 78. The contiguous end of the large piston 77 is formed with a peripheral notch 79 so that the control passage 78 will be open to the cylinder 70 in all positions of reciprocation of the two pistons.

The valve 69 is operable to connect the control passage 78 either to the exhaust passage 60 at the outlet side of the back pressure valve 68 or to a low pressure passage 80 adapted to receive fluid under a fluctuating pressure from the pump 61. In its preferred form, the valve 69 comprises a casing 81 which is formed with a valve bore 82 and with two peripheral ports 83 and 84 in the bore connected respectively to the passages 60 and 78. A valve member 85 of the spool type is reciprocable in the bore 82. One end of the bore 82 constitutes a fluid pressure cylinder connected to the passage 80, and the contiguous end of the valve member 85 constitutes a fluid pressure responsive piston formed with a peripheral port 86 in free communication with the passage 80 and movable into and out of communication with the port 84. A coiled compression spring 87 engages the other end of the valve member 85 and normally acts to maintain the valve member in one end position wherein the ports 83 and 84 are in communication and the port 86 is blocked. In this position of the valve, no back pressure is maintained in the motor cylinder 70, and consequently the large piston 77 will remain in engagement with the shoulder 75 and will reciprocate as a unit with the small piston 76 to effect feed operation.

When the pressure in the passage 80 is increased to a point sufficient to overcome the pressure of the spring 87, the valve member 85 will be shifted to interrupt communication between the ports 83 and 84 and to establish communication between the ports 84 and 86. As a result, fluid will be supplied through the passage 78 to establish a back pressure in the cylinder 70, and this back pressure will maintain the large piston 77 against the pressure end of the cylinder 70 so that the entire volume of the motive fluid supplied through the passage 59 will be handled by the small piston 76 to effect rapid traverse operation.

The pressure of the fluid within the low pressure passage 80 is caused to fluctuate selectively to above and below the minimum pressure required to actuate the control valve 69 in opposition to the spring 87. This pressure variation is under the control of a charging and neutral valve 88 (see Fig. 16) which is connected to open and close a by-pass from the low pressure passage 80 to the sump 63. In its preferred form, the valve 88 comprises a housing 89 having a valve bore 90 formed with an annular port 91 opening to a drain passage 92 leading to the sump 63. One end of the bore 90 is enlarged to define a chamber 93 connected to an inlet passage 94 from the pump 61 and to the low pressure passage 80. The other end of the bore 90 is connected to a control passage 95 adapted to be selectively opened and closed as hereinafter described. A valve plunger 96 is reciprocable in the bore 90, and is normally urged inwardly by a coiled compression spring 97 into position to block the port 91 from the chamber 93, this position being defined by a stop pin 98. The valve plunger 96 is formed with a restricted bleed hole or opening 99 opening therethrough to permit a comparatively gradual equalization of pressures in opposite ends of the valve bore 90. In operation, when the control passage 95 is blocked or closed, fluid from the chamber 93 passes through the small hole 99 to equalize the pressures acting on opposite ends of the valve plunger 96. As a result, the spring 97 maintains the plunger 96 in the innermost position against the stop pin 98 to block the port 91. The pressure in the low pressure passage 80 is therefore elevated sufficiently to effect actuation of the control valve 69 for rapid traverse motor operation. When the control passage 95 is opened, the pressure back of the valve plunger 96 is partially dissipated, and hence a hydraulic differential acting in opposition to the spring 97 is established. It will be understood that the flow of fluid through the hole 99 is sufficiently restricted to maintain this differential. As a result, the valve plunger 96 is moved to partially open position into a state of equilibrium to spill or by-pass excess fluid from the low pressure passage 80 to the sump 63. The attendant pressure drop in the passage 80 permits the control valve 69 to condition the motor 47 for slow feed operation.

The control conduit 95 is subject to be selectively blocked or opened either by an automatic valve 100 (Fig. 15) operable from the cam shaft 27 to obtain a predetermined program of rapid transverse and feed movements in the automatic machine cycle, or by a hand operable valve 101 (Figs. 9 to 14) available at any time to assume control. In the present instance, the hand valve 101 is of the rotary type, having an actuating lever 102 at the front of the machine frame 10. The valve 101 comprises a suitable casing 103 formed with a longitudinal bore 104, and closed at the ends by suitable plates 105 and 106. A valve sleeve 107 is fixed in the bore 104, and a rotary valve member or plug 108 is mounted therein and has axial end extensions 109 and 110 projecting through the end plates 105 and 106. A pinion 111 is fixed on the extension 109, and meshes with a gear sector 112 operable by the hand lever 102.

The valve bore 104 is formed with longitudinally spaced inner peripheral grooves 113, 114, 115, 116, 117 and 118 which open respectively through ports 119, 120, 121, 122, 123 and 124 to the interior of the sleeve 107. Formed in the valve member 108 are a plurality of transverse bores or passages 125, 126, 127, 128 and 129 and two diametrically spaced longitudinal grooves 130 opening from the bore 125. These bores and grooves are disposed for movement into and out of communication with the ports 120 to 124 and 119 respectively. The bores 125 to 129 are in intercommunication through an axial bore 131 formed in the valve member 108 and opening through the axial extension 110. A pressure relief valve is interposed in the axial bore 131 between the transverse bores 125, 126 and 127 on one hand and the bores 128 and 129 on the other hand. The valve comprises an annular seat 132 adapted for engagement by a ball 133 mounted on the inner end of a spool plunger 134 slidable in the outer end of the axial bore 131. A coiled compression spring 135 acting on the outer end of the plunger 134 tends to maintain the ball 133 against the seat 132. The plunger 134 is longitudinally fluted to permit the passage of fluid to the bores 128 and 129 when the relief valve is open.

The various grooves 113 to 115 are connected respectively to a branch 136 of the main pressure passage 59, an auxiliary pressure passage 137 and the control passage 95. An exhaust or drain passage 138 opens from the groove 116 and also from the groove 117 through a longitudinal groove 139 connecting the grooves 116 and 117. The groove 118 is connected to a control passage 140 which is an extension of the passage 95 and which leads to the automatic valve 100. The valve plug 108 has four selective positions of rotary adjustment which are identified by the legends "Rapid," "Feed," "Stop" and "Automatic" affixed to the front of the machine frame 10 in association with the hand lever 102. In the "stop" position as shown in Figs. 9 to 14, all of the passages are connected to drain. More specifically, the motive fluid normally passing from the pump 61 through the passage 59 to the motor 47 is released or by-passed to the sump 63 through 136—113—119—130—125—131—127—122—116—138 to stop the operation of the motor. Similarly, the passages 137 and 95 are connected respectively through the grooves 114 and 115, the ports 120 and 121 and the bores 125 and 126 to the axial bore 131, and thence in common through the bore 127, the ports 122 and the groove 116 to the exhaust passage 138. In the other three valve positions, the grooves 130 are out of communication with the ports 119 to block the branch pressure passage 136, the bore 125 is out of communication with the ports 120 to block the pressure passage 137, and the bore 127 is out of communication with the ports 122 to disconnect the axial bore 131 from the drain passage 138, so that the system is conditioned for operation. In the "automatic" position, the exhaust ports 123 are blocked, and the control passages 95 and 140 are connected, thereby placing the motor 47 under the control of the automatic valve. The connection is from 95, through 115—121—126—131—relief valve 132, 133—129—124—118 to 140. When the valve 101 is adjusted out of the automatic position, the ports 124 are blocked to interrupt the connection and thereby functionally disable the automatic valve 100. In the "rapid" position, the ports 121 are blocked to disconnect the control passage 95 from the exhaust passage 138. In the "feed" position, the control passage 95 is connected through 115—121—126—131—relief valve 132, 133—128—123—117—139—116 to the drain passage 138. The relief valve 132, 133 is set to maintain a minimum pressure in the control passage 95, both in the "feed" position and the "automatic" position of the valve 101, so as to insure the maintenance of a correspondingly reduced pressure in the low pressure passage 80 for operating various machine auxiliaries. In this connection, it is to be noted that the pressures in the low pressure passage 80 and the control passage 95 will be always substantially alike during both rapid traverse and feed conditions. In the "feed" position, the pressure in the low pressure passage 80 is only slightly higher than the pressure in the control passage 95 by the amount of pressure required to overcome the pressure of the spring 97 in opening the valve 88.

The automatic valve 100 (Fig. 15) comprises a casing 141 mounted within the frame 10, and having port connections with the control passage 140 and a drain passage 142 leading to the sump 63. Mounted within the casing 141 are two projecting valve plungers 143 and 144 which are mechanically interconnected by a link 145 for alternate actuation respectively to disconnect and connect the passages 140 and 142. More particularly, the plunger 143 when moved inwardly serves to block or close the control passage 140, and to project the plunger 144 outwardly into position for external actuation, and hence is termed the "rapid traverse" plunger. Similarly, the plunger 144 when moved inwardly serves to project the plunger 143 outwardly into position for external actuation, and thereby to effect connection of the passages 140 and 142, and hence is termed the "feed" plunger. The plungers 143 and 144 are arranged for automatic operation respectively by "rapid traverse" and "feed" dogs 146 and 147 on a cam disk 148 fixed on the main cam shaft 27. In the present instance, the disk 148 is formed with two concentric series of peripherally spaced arcuate slots 149 and 150 in which the dogs 146 and 147 are respectively secured. Six slots are provided in each series, and hence any number of associated dogs, from one to six in each set, may be provided and relatively adjusted on the disk, the number and spacing of the dogs of the two sets being dependent on the desired program of movements in each machine cycle. It will be seen that the disk 148 will make one complete revolution for each complete revolution of the turret 33. By virtue of this arrangement, six sets of two or more dogs 146 and 147, one for each tool hole 34, may be provided so that the program of rapid traverse and feed movements for each of the series of tool reciprocations in the complete machine cycle may be independently controlled. Similar independent control of the speed and direction of rotation of the spindle 13 for each tool reciprocation is also afforded by the disk 26 with an appropriate number of dogs for actuating the valves 24 and 25.

The pump 61 is of the variable delivery type. Details of the pump construction are not shown since, per se, they form no part of the present invention. It is sufficient to say that the pump 61 embodies means having an external control shaft 151 for adjusting the displacement from zero or neutral to maximum. Variations in the fluid displacement of the pump 61 into the passage 59 will result in corresponding changes in the speed of the motor 47.

Figure 4:
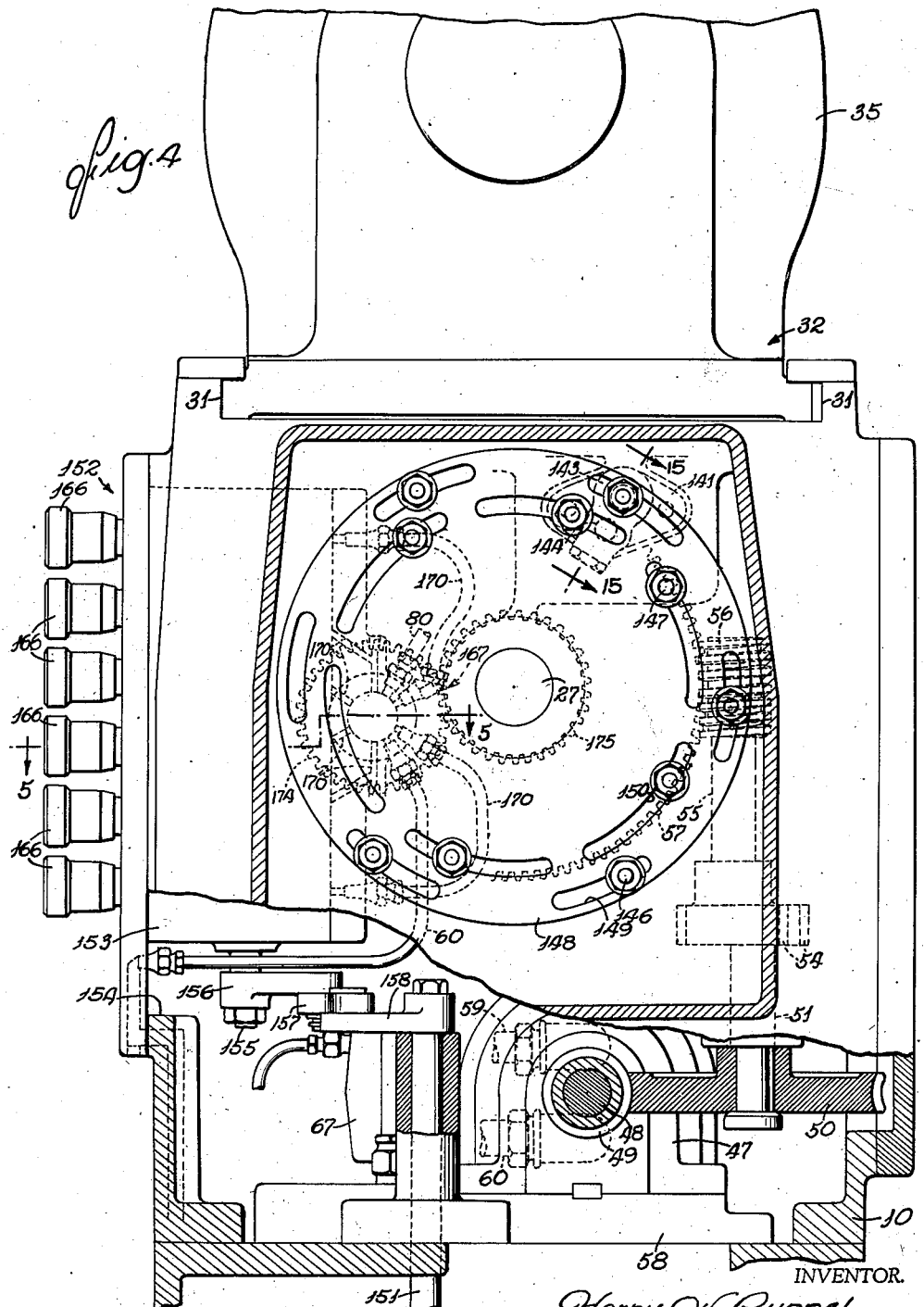
Fig. 4 is a fragmentary transverse partial vertical sectional view of the machine.

Means is provided for automatically controlling the pump displacement particularly effective during feed operation to adjust the speed of the motor 47 as desired over a given range, whereby each of the tools may be translated at an independent rate when in feed in the course of its cutting cycle. In the present instance, this means comprises a feed regulator mechanism 152 (Figs. 4, 5 and 6) having a casing 153 mounted in an opening 154 in the front of the machine frame 10. Journaled in the casing 153 and projecting from the lower end thereof is a vertical shaft 155. An arm 156 fixed on the lower end of the shaft 155 is connected through an adjustable link 157 to an arm 158 fixed on the pump control shaft 151. A coiled tension spring 159 anchored at opposite ends to the frame 10 and the arm 156 tends to rotate the shaft 151 in a direction to adjust the pump 61 toward neutral, i. e., to reduce the pump displacement. A series of hydraulic actuators 160 are arranged along the shaft 155 within the casing 153, and are selectively operable to rotate the shaft in opposition to the spring 159 into a predetermined feed position.

The hydraulic actuators 160 are alike in construction, and hence a description of one will suffice for all. Referring to Fig. 5, the actuator 160 comprises a single end cylinder 161 formed in the casing 153. A piston 162 is reciprocable in and projects from the cylinder 161 for movement transversely of the shaft 155. The outer end of the piston 162 is formed in one side with a notch 163 presenting a transverse abutment face 164 in engagement with a lateral arm 165 fixed on the shaft 155. Upon the supply of pressure fluid to the closed end of the cylinder 161 the piston 162 will be moved outwardly to rotate the shaft 155 in a direction to increase the displacement of the pump 61. Outward movement of the piston 162 is limited by a micrometer stop screw 166 mounted in the casing 153 for adjustment from the front exterior of the machine frame 10 to obtain the desired rate of tool feed. In the present instance, the inner end of the screw 166 extends into the casing 153 for end engagement by the piston 162. It will be understood that there is a shaft arm 165 and a stop screw 166 to determine the feed adjustment for each of the actuators 160. Six actuators are provided to correspond in number to the turret holes 34, and to provide an independent feed rate control for each tool.

Selective operation of the hydraulic actuators 160 in accordance with the successive index positions of the tool turret 33 is under the control of a rotary selector valve 167. This valve has a cylindrical casing 168 on the rear of the casing 153 and formed with six peripherally spaced ports 169 connected respectively through passages or lines 170 to the pressure ends of the cylinders 161. The casing 168 is also provided with diametrically spaced pressure and exhaust ports 171 and 172 connected respectively to the low pressure and drain passages 80 and 60. A rotary valve member 173 is mounted in the bore of the casing 168, and is connected to the cam shaft 27 through gears 174 and 175 for continuous indexing rotation in timed relation to the indexing movements of the turret 33. The valve member 173 is formed with a peripheral recess 176 always in communication with the exhaust passage 60 and partially interrupted by a land 177 movable individually across the ports 169. The member 173 is also formed with a passage 178 which opens at one end to a peripheral groove 179 always in communication with the low pressure passage 80. Two charging ports 180 and 181 open at longitudinally spaced points from the passage 178 to the face of the land 177. One port 180 is in the transverse plane of three of the ports 169 (Fig. 7) and the other port 181 is in the transverse plane of the other three ports 169 (Fig. 6). It will be seen that in each rotation of the valve member 175, during which the turret 33 will be indexed step-by-step through one revolution, fluid under pressure will be supplied individually to the successive actuator ports 169, and those ports in the train of the port under pressure will be connected to the drain passage 60. It follows that while each tool is in the working station and moving through its cutting cycle, the associated one of the actuators 160 is rendered operative to determine the available rate of feed movement. Each feed rate may be adjusted over a substantial range, and the independent feed rates for any two or more of the tools may be made alike or different, by appropriate individual adjustments of the stop screws 166, to obtain the feed rate best adapted for each type of metal removing operation.

Figure 3:
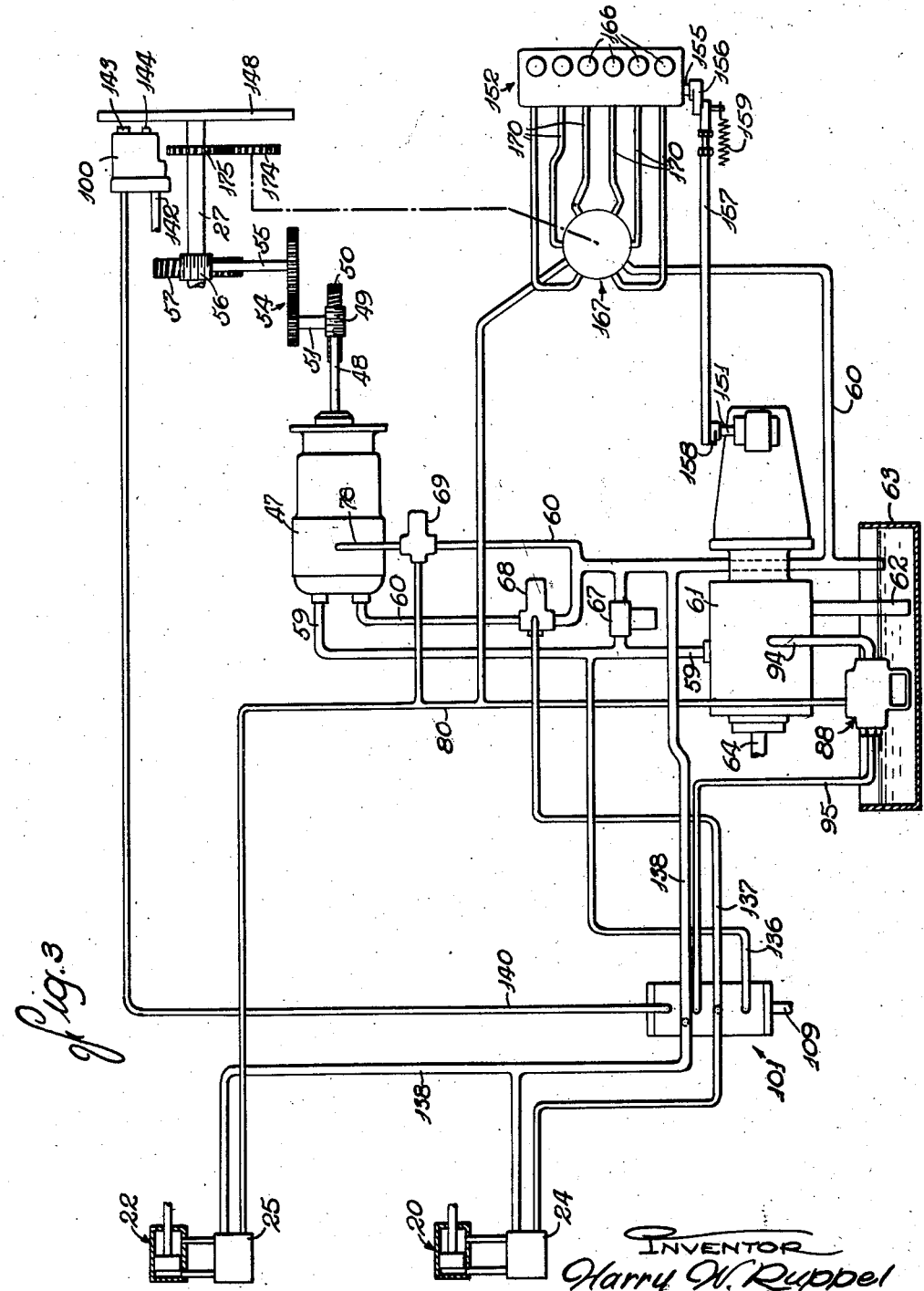
Fig. 3 is a diagrammatic representation of the hydraulic transmission.

The hydraulic system also includes the actuators 20 and 22 for the direction and speed clutches in the drive for the work spindle 13. Thus, the control valves 24 and 25 for these actuators are connected in common to the drain passage 138. The valve 24 is connected to the pressure passage 137 which branches from the passage 60 at the up-stream side of the back pressure valve 68, and the valve 25 is connected to a branch of the low pressure passage 80. In operation, referring particularly to Fig. 3, the valve 88 is operable to increase the pressure in the line 80 when the line 95 is blocked and to decrease the pressure in the line 80 when the line 95 is connected to the exhaust line 138. The control line 95 is adapted to be blocked or connected to the exhaust line 138 by means of the automatic valve 100 or the manually operable valve 101. Upon a rise in pressure in the line 80, the valve 69 is operable to connect the lines 78 and 80 so as to adjust the displacement of the motor 47 for rapid traverse. Upon a drop in pressure in the line 80, the valve 69 is operable to connect the control line 78 to the drain line 60 so as to adjust the displacement of the motor 47 for feed operation. Hence, the motor 47 is adjustable in response to pressure fluctuations in the auxiliary pressure line 80 and these pressure fluctuations are effected by the valve 88 under control of the line 95, in turn controlled by the valve 100 or the valve 101. The speed of the motor 47 is also subject to variation by adjusting the displacement of the pump 61 through the medium of the unit 152.

I claim as my invention:

1. In a machine tool, in combination, a support, a turret having a plurality of peripherally spaced fixture supporting means and being mounted on said support for recurrent reciprocation and for rotary indexing movements between successive reciprocations, means including a hydraulic motor for reciprocating and indexing said turret in timed relation, a variable delivery pump having an adjustment member and connected to supply fluid under pressure to said motor, and means automatically operable in timed relation to the indexing movements of said turret to control said adjustment member, said last mentioned means including a plurality of hydraulic actuators for said adjustment member selectively operable in successive positions of said turret and individually adjustable to vary the extent of movement of said member.

2. In a machine tool, in combination, a support, a movable element mounted on said support for recurrent reciprocation, means including a hydraulic motor for reciprocating said element, a variable delivery pump having a displacement adjustment member and connected to supply fluid under pressure to said motor to operate the latter at a speed corresponding to the pump displacement, a plurality of hydraulic actuators individually operable to adjust said member, means for individually determining the extent of movement of said actuators and thereby the adjustment of said member, and valve means operable in timed relation to said element to effect successive operation of said actuators.

3. In a machine tool, in combination, a support, a machine element mounted for movement on said support, means including a hydraulic motor for driving said element, said motor being adjustable to vary its displacement for obtaining rapid traverse and feed operation, a pump having a discharge passage connected to supply motive fluid to said motor, an auxiliary fluid pressure passage, means including a control passage operable when blocked to effect a pressure rise in said auxiliary passage and when unblocked to effect a pressure reduction in said auxiliary passage, hydraulic means controlled by said auxiliary passage to effect adjustment of said motor for a rapid traverse operation in response to said pressure rise and feed operation in response to said pressure drop, and means operable selectively to block and unblock said control passage.

4. In a machine tool, in combination, a support, a machine element mounted for movement on said support, means including a hydraulic motor for driving said element and being adjustable in displacement to obtain rapid traverse and feed rates, a pump having a discharge passage connected to supply motive fluid to said motor and having an auxiliary discharge passage, a drain, means including a control passage operable when blocked from said drain to effect a pressure rise in said auxiliary passage and when unblocked to effect a pressure reduction in said auxiliary passage, hydraulic means controlled by said auxiliary passage to effect adjustment of said motor for a rapid traverse operation in response to said pressure rise and feed operation in response to said pressure drop, and means automatically operable in timed relation to the movement of said element to alternately block and unblock said control passage.

5. In a machine tool, in combination, a support, a machine element mounted for movement on said support, means including a hydraulic motor for driving said element and being adjustable in displacement to obtain rapid traverse and feed rates, a pump having a discharge passage connected to supply motive fluid to said motor and having an auxiliary discharge passage, a drain, a valve for by-passing said auxiliary passage to said drain and having a valve member with one end exposed to the pressure in said auxiliary passage and the other end connected through a bleed port to said auxiliary passage, spring means tending to urge said valve member into closed position, a control passage opening from said other end of said valve member, a low pressure relief valve interposed in said control passage, valve means operable in one position to connect said control passage to drain whereby to hydraulically unbalance said valve member to effect opening of said valve, and in another position to disconnect said control passage from drain whereby to effect hydraulic balance of said valve member through said port and consequent closing of said valve, and means controlled by said auxiliary passage to adjust said motor for rapid traverse operation when said valve is closed and feed operation when said valve is open.

6. In a machine tool, in combination, a support, a machine element mounted for movement on said support, means including a hydraulic motor for driving said element, said motor being adjustable to vary its displacement for obtaining rapid traverse and feed operation, a pump having a discharge passage connected to supply motive fluid to said motor, an auxiliary fluid pressure passage, means including a control passage operable when blocked to effect a pressure rise in said auxiliary passage and when unblocked to effect a pressure reduction in said auxiliary passage, hydraulic means controlled by said auxiliary passage to effect adjustment of said motor for a rapid traverse operation in response to said pressure rise and feed operation in response to said pressure drop, a valve operable alternately to block and unblock said control passage, a disk rotatable by said motor, and dogs adjustably mounted on said disk for actuating said valve in predetermined timed relation to the movement of said element.

7. In a machine tool, in combination, a support, a machine element mounted for movement on said support, means including a hydraulic motor for driving said element, said motor being adjustable to vary its displacement for obtaining rapid traverse and feed operation, a pump having a discharge passage connected to supply motive fluid to said motor, an auxiliary fluid pressure passage, means including a control passage operable when blocked to effect a pressure rise in said auxiliary passage and when unblocked to effect a pressure reduction in said auxiliary passage, hydraulic means controlled by said auxiliary passage to effect adjustment of said motor for a rapid traverse operation in response to said pressure rise and feed operation in response to said pressure drop, a drain, and a valve operable in one position to connect said control passage to said drain and in another position to disconnect said control passage from said drain.

8. In a machine tool, in combination, a support, a machine element mounted for movement on said support, means including a hydraulic motor for driving said element, said motor being adjustable to vary its displacement for obtaining rapid traverse and feed operation, a pump having a discharge passage connected to supply motive fluid to said motor, an auxiliary fluid pressure passage, means including a control passage operable when blocked to effect a pressure rise in said auxiliary passage and when unblocked to effect a pressure reduction in said auxiliary passage, hydraulic means controlled by said auxiliary passage to effect adjustment of said motor for a rapid traverse operation in response to said pressure rise and feed operation in response to said pressure drop, a relatively unrestricted drain passage, a second drain passage including a low pressure relief valve, and a valve operable selectively to connect said control passage to said unrestricted drain passage, or said second drain passage or to disconnect said control passage from said drain passages.

9. In a machine tool, in combination, a support, a machine element mounted for movement on said support, means including a hydraulic motor for driving said element, said motor being adjustable to vary its displacement for obtaining rapid traverse and feed operation, a pump having a discharge passage connected to supply motive fluid to said motor, an auxiliary fluid pressure passage, means including a control passage operable when blocked to effect a pressure rise in said auxiliary passage and when unblocked to effect a pressure reduction in said auxiliary passage, hydraulic means controlled by said auxiliary passage to effect adjustment of said motor for a rapid traverse operation in response to said pressure rise and feed operation in response to said pressure drop, a second control passage, a drain passage, a valve operable in one position to connect said control passages, in another position to connect said first mentioned control passage to said drain passage and in a third position to disconnect said control passages and to block said first mentioned control passage, and valve means automatically operable in timed relation to said element for alternately opening and closing said second control passage.

10. In a machine tool, in combination, a movable element, means including a hydraulic motor for driving said element, a pump having a high pressure discharge passage connected to said motor, an exhaust passage opening from said motor and including a back pressure valve, a drain and a manual control valve selectively operable in one position to block said high pressure passage and said exhaust passage from said drain and in another position to connect said high pressure passage and said exhaust passage in advance of said back pressure valve to said drain.

11. In a machine tool, in combination, a movable element, means including a hydraulic motor for driving said element, a pump having a first discharge passage connected to said motor and having a second discharge passage, an exhaust passage opening from said motor and including a back pressure valve, a drain, means including a control passage operable to effect a pressure rise in said second passage when said control passage is closed and to effect a pressure drop in said second passage when said control passage is connected to said drain, and a control valve selectively operable in one position to block said first passage, said exhaust passage and said control passage from drain, and in another position to connect said first passage, said exhaust passage, and said control passage to drain.

12. In a machine tool, in combination, a support, a spindle mounted for rotation on said support and having a chuck, a stock feed mechanism for advancing bar stock periodically through said spindle into said chuck, means for driving said spindle including direction control clutch means having a hydraulic actuator and including selective speed control clutch means having a hydraulic actuator, a tool element mounted on said support for movement relative to said chuck, means including a hydraulic motor for driving said stock feed mechanism and said tool element, a pump having a main discharge passage connected to supply motive fluid to said motor and having a second discharge passage, an exhaust passage including a back pressure valve opening from said motor, means for controlling the pressure in said second passage and including a control passage effective when blocked from exhaust to cause a pressure increase in said second passage and when connected to exhaust to effect a pressure reduction in said second passage, hydraulic means for adjusting the speed of said motor in response to pressure variations in said second passage, valve means operable to connect said second passage alternately to opposite sides of the hydraulic actuator for said speed control clutch, valve means for connecting said exhaust passage ahead of said back pressure valve alternately to opposite sides of the hydraulic actuator for said direction control clutch, means operable in timed relation to said motor to actuate said two valve means in timed sequence, and valve means manually operable at will for controlling said main passage and said control and exhaust passages, said valve means having a stop position connecting said last mentioned passages to drain, a feed position blocking said main passage and said exhaust passage from drain and connecting said control passage to drain, and a rapid traverse position blocking said main passage, exhaust passage and control passage from drain.

13. In a machine tool, in combination, a support, a spindle mounted for rotation on said support, means for driving said spindle including control clutch means having a hydraulic actuator, a tool element mounted on said support for movement relative to said spindle, means including a hydraulic motor for driving said tool element, a pump having a main discharge passage connected to supply motive fluid to said motor and having a second discharge passage, means for controlling the pressure in said second passage and including a control passage effective when blocked from exhaust to cause a pressure increase in said second passage and when connected to exhaust to effect a pressure reduction in said second passage, hydraulic means for adjusting the speed of said motor in response to pressure variations in said second passage, valve means operable to connect said second passage alternately to opposite sides of said hydraulic actuator, and valve means for controlling said main and control passages, said valve means having a stop position connecting said last mentioned passages to drain, a feed position blocking said main passage and connecting said control passage through a low pressure relief valve to drain, and a rapid traverse position blocking said main passage and control passage from drain.

14. In a machine tool, in combination, a support, a spindle mounted for rotation on said support, means for driving said spindle including direction control clutch means having a hydraulic actuator and including selective speed control clutch means having a hydraulic actuator, a tool element mounted on said support for movement relative to said chuck, means including a hydraulic motor for driving said tool element, a pump having a main discharge passage connected to supply motive fluid to said motor and having a second discharge passage, an exhaust passage including a back pressure valve opening from said motor, valve means operable to connect said second passage alternately to opposite sides of one of said hydraulic actuators, valve means for connecting said exhaust passage alternately to opposite sides of the other of said hydraulic actuators, and means operable in timed relation to said motor to actuate said two valve means in timed sequence.

15. In a machine tool, in combination, a support, an element movable on said support, a hydraulic transmission for driving said element and including speed adjusting means having a control passage adapted when blocked to effect one rate of travel and when unblocked to effect a different rate of travel, a second control passage, a valve operable to connect and disconnect said passages, and a valve automatically operable in predetermined adjustable timed relation to the movement of said element selectively to block and unblock said second control passage.

16. In a machine tool, in combination, a support, an element movable on said support, an exhaust passage, a hydraulic transmission for driving said element and including speed adjusting means having a control passage adapted when connected to said exhaust passage to establish one rate of travel of said element and when disconnected from said exhaust passage to establish a different rate of travel of said element and also including speed adjusting means having an adjustable member for selectively adjusting the slower rate of travel of said element, valve means for selectively connecting and disconnecting said passages, and means automatically operable in timed relation to the movements of said element to adjust said member to obtain a predetermined sequence of slow rate movements.

17. In a machine tool, in combination, a support, a turret having a plurality of peripherally spaced fixture supporting means and being mounted on said support for recurrent axial reciprocation and for rotary indexing movements respectively between successive reciprocations to position said fixture supporting means successively in a working station, hydraulic means for reciprocating and indexing said turret and having means including a control unit for effecting selective rapid traverse and feed movements, a cam disk continuously rotatable by said hydraulic means in timed relation to the rotation of said turret, and a plurality of sets of dogs adjustably mounted on said cam disk for actuating said control unit independently for different index positions of said turret whereby to obtain independent programs of rapid traverse and feed movements respectively for said turret in said different index positions.

HARRY W. RUPPEL.